US012675676B2

(12) United States Patent　　　　(10) Patent No.:　US 12,675,676 B2
Kiranyaz et al.　　　　　　　　　　　(45) Date of Patent:　　Jul. 7, 2026

---

(54) OPERATIONAL NEURAL NETWORKS AND SELF-ORGANIZED OPERATIONAL NEURAL NETWORKS WITH GENERATIVE NEURONS

(71) Applicant: QATAR UNIVERSITY, Doha (QA)

(72) Inventors: Serkan Kiranyaz, Doha (QA); Junaid Malik, Tampere (FI); Turker Ince, Balcova-Izmir (TR); Alexandros Iosifidis, Aarhus (DK); Moncef Gabbouj, Tampere (FI)

(73) Assignee: Qatar University, Doha (QA)

( * ) Notice: Subject to any disclaimer, the term of this patent is extended or adjusted under 35 U.S.C. 154(b) by 1098 days.

(21) Appl. No.: 17/566,281

(22) Filed: Dec. 30, 2021

(65) Prior Publication Data

US 2022/0207330 A1　　　Jun. 30, 2022

Related U.S. Application Data

(60) Provisional application No. 63/133,128, filed on Dec. 31, 2020, provisional application No. 63/132,292, filed on Dec. 30, 2020.

(51) Int. Cl.
　　*G06N 3/04*　　　　(2023.01)
　　*G06N 3/047*　　　(2023.01)
　　*G06N 3/048*　　　(2023.01)
(52) U.S. Cl.
　　CPC ............. *G06N 3/048* (2023.01); *G06N 3/047* (2023.01)
(58) Field of Classification Search
　　CPC ............................... G06N 3/047; G06N 3/048
　　See application file for complete search history.

(56) References Cited

U.S. PATENT DOCUMENTS

2017/0316308 A1* 11/2017 Srivastava ............. G06N 3/084

OTHER PUBLICATIONS

Merolla, Paul, et al. "Deep neural networks are robust to weight binarization and other non-linear distortions." arXiv preprint arXiv: 1606.01981 (2016). (Year: 2016).*

Chen, Xiaoyun, Qiang Ma, and Talal Alkharobi. "New neural networks based on Taylor series and their research." 2009 2nd IEEE International Conference on Computer Science and Information Technology. IEEE, 2009. (Year: 2009).*

Kiranyaz et al., "Self-Organized Operational Neural Networks with Generative Neurons," arXiv:2004.11778, DOI: 10.48550/arXiv.2004. 11778 (2020) Apr. 24, 2020.

* cited by examiner

*Primary Examiner* — Hal Schnee

(74) *Attorney, Agent, or Firm* — Hodgson Russ LLP

(57)　　　　ABSTRACT

Systems, methods, apparatuses, and computer program products for neural networks. In accordance with some example embodiments, an operational neuron model may comprise an artificial neuron comprising a composite nodal operator, a pool-operator, and an activation function operator. The nodal operator may comprise a linear function or non-linear function. In accordance with certain example embodiments, a generative neuron model may include a composite nodal-operator generated during the training using Taylor polynomial approximation without restrictions. In accordance with various example embodiments, a self-organized operational neural network (Self-ONN) may include one or more layers of generative neurons.

10 Claims, 6 Drawing Sheets

OPERATIONAL NEURAL NETWORKS AND SELF-ORGANIZED OPERATIONAL NEURAL NETWORKS WITH GENERATIVE NEURONS

CROSS-REFERENCE TO RELATED APPLICATION

This application claims the benefit of U.S. Provisional Application No. 63/132,292, filed Dec. 30, 2020, and U.S. Provisional Application No. 63/133,128, filed Dec. 31, 2020. The entire content of the above-referenced applications is hereby incorporated by reference.

TECHNICAL FIELD

Some example embodiments may generally relate to neural networks, such as convolutional neural networks and recurrent neural networks.

BACKGROUND

Neural networks may include a network of neurons capable of performing functions such as artificial intelligence, predictive modeling, and scenario training.

SUMMARY

In accordance with some example embodiments, an operational neuron model may comprise an artificial neuron comprising a composite nodal operator, a pool-operator, and an activation function operator. The nodal operator may comprise a linear function or non-linear function.

In accordance with various example embodiments, a generative neuron model may comprise a composite nodal operator generated during training using Taylor polynomial approximation without restrictions.

In accordance with certain example embodiments, an operational neural network (ONN) may comprise a neuron model configured to perform at least one linear or non-linear transformation in each of a plurality of neuron layers.

In accordance with some example embodiments, an operational neural network may comprise one or more layers of operational neurons.

In accordance with various example embodiments, a self-organized operational neural network (Self-ONN) may comprise one or more layers of generative neurons.

BRIEF DESCRIPTION OF THE DRAWINGS

For proper understanding of example embodiments, reference should be made to the accompanying drawings, wherein.

pool $$P_i^{l+1},$$

and activation $$f_i^{l+1}$$

operators.

Figure 3A:
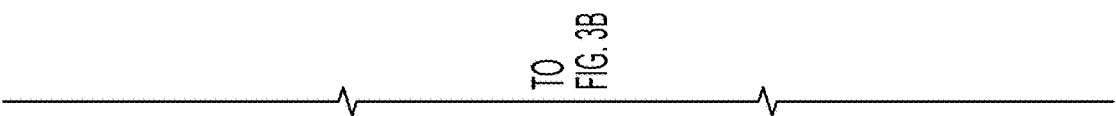
Figure 3B:
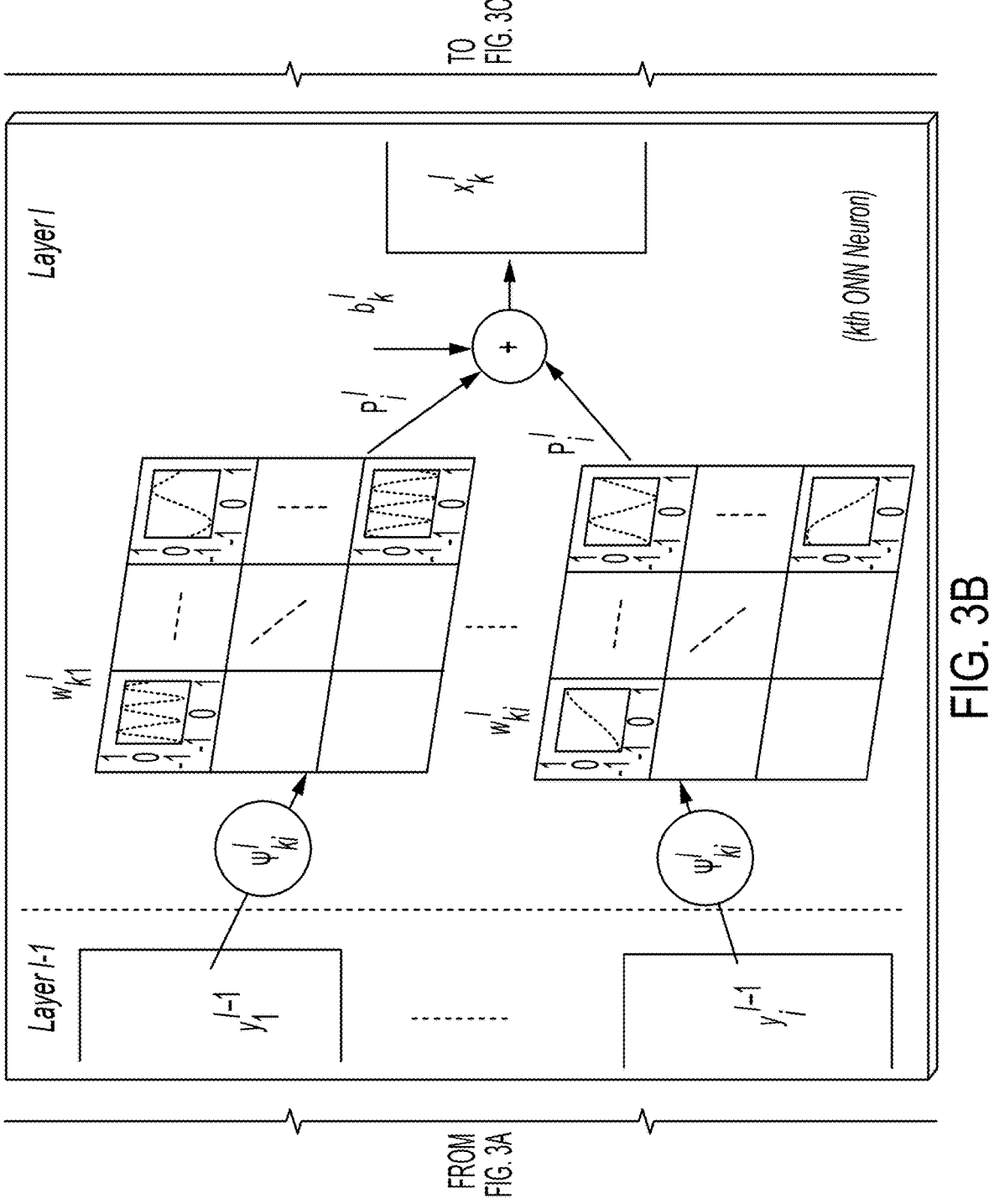
Figure 3C:
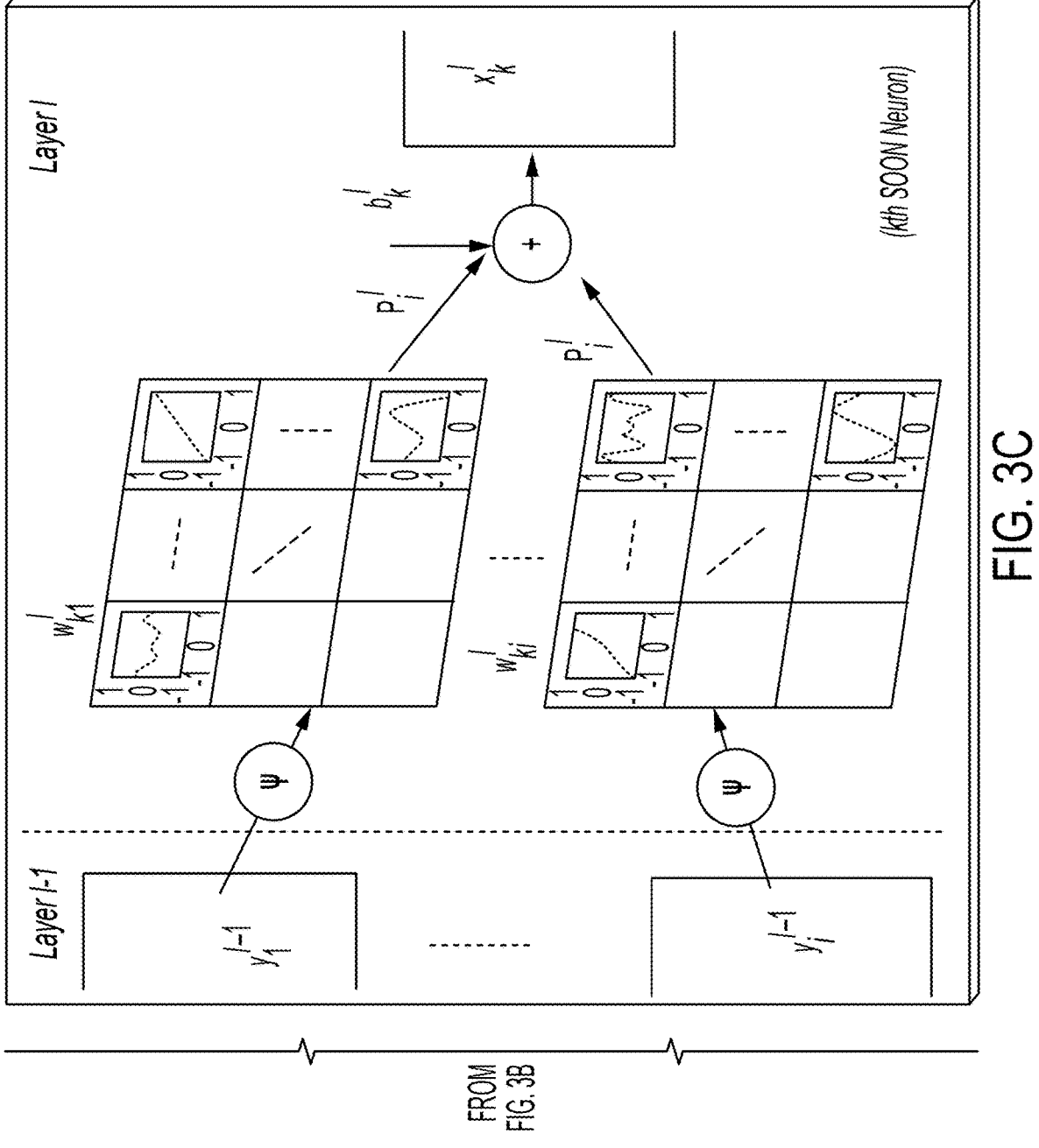

FIG. 3 illustrates an example of nodal operations in kernels of a $k^{th}$ convolutional neural network (left), operational neural network (middle), and self-operational neural network (right) neurons at layer/according to certain example embodiments.

Figure 4:
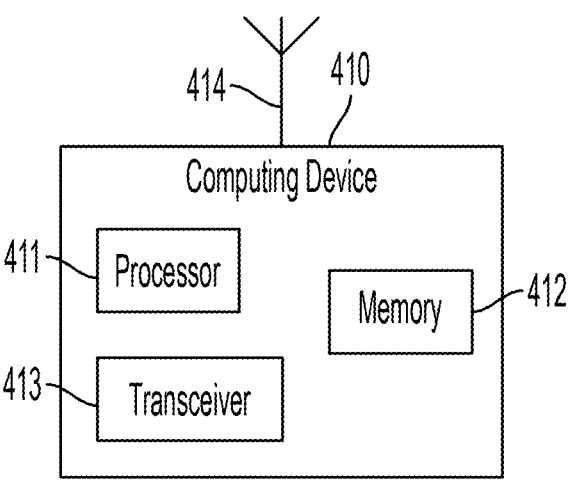

FIG. 4 illustrates an example of a computing device according to some example embodiments.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for neural networks is not intended to limit the scope of certain example embodiments, but is instead representative of selected example embodiments.

The use of artificial neural networks has wide applicability in business and industry applications. For example, there is increasing interest in using neural networks in artificial intelligence (AI) and its applications for smart devices, internet of things (IoT), and other high-tech domains. Some examples include GOOGLE's self-driving car, AI-based personal assistants like SIRI, and applications of deep learning. Thus, AI is applicable in a diverse and multitudinous number of technical fields.

In various example embodiments, operational neural networks (ONNs) may address the limitations and drawbacks of conventional convolutional neural networks (CNNs), such as network homogeneity with the sole linear neuron model. For example, ONNs may include heterogeneous networks with a generalized neuron model that may encapsulate any set of non-linear operators to boost diversity and to learn highly complex and multi-modal functions or spaces with minimal network complexity and training data. However, using a greedy iterative search (GIS) method to find optimal operators in ONNs may require numerous training sessions to find a single operator set per layer. In addition to being computationally demanding, network heterogeneity may also be limited since the same set of operators may then be used for all neurons in each layer. In addition, ONN performance may directly depends on the operator set library used, introducing a certain risk of performance degradation, especially when the optimal operator set needed for a particular task is missing from the library.

Furthermore, conventional, fully-connected, and feed-forward neural networks, such as multi-layer perceptrons (MLPs) and radial basis functions (RBFs), are universal approximators. Such neural networks optimized by iterative processes and/or formed by using random architectures and solving a closed-form optimization problem for the output weights, may approximate any continuous function, assuming a sufficient number of employed neural units (i.e., the neurons) capable of performing nonlinear piecewise continuous mappings of the receiving signals and sufficient capacity of the network (i.e., the number of layers' neurons). The standard approach in using such traditional neural networks may include manually defining the network's architecture (i.e., the number of neural layers, the size of each layer), and use the same activation function for all neurons of the network.

Although suitable network architectures may be identified based on available data, either progressively or by following extremely laborious search strategies, the resulting network architectures may still exhibit varying or entirely unsatisfactory performance levels, especially when applied to highly complex and nonlinear problems. This may be because traditional neural networks employ a homogenous network structure consisting of a crude model of the biological neurons. This neuron model may be capable of performing a linear transformation (i.e., linear weighted sum), while biological neurons or neural systems in general are built from a large diversity of neuron types with heterogeneous, varying structural, biochemical and electrophysiological properties. For instance, some mammalian retina may include 55 different types of neurons to perform the low-level visual sensing. Therefore, while these homogenous neural networks may approximate the responses of the training samples, they may not learn the actual underlying functional form of the mapping between the inputs and the outputs of the problem. There have been some attempts to modify MLPs by adjusting the neuron model and/or conventional back propagation (BP) algorithm, or the parameter updates; however, their performance improvements may not be significant in general since such approaches still inherit the main drawback of MLPs (i.e., homogenous network configuration with the same (linear) neuron model). Extensions of the MLP networks particularly for end-to-end learning of 2D (visual) signals (i.e., CNNs, and time-series data, recurrent neural networks (RNNs), and long short-term memories (LSTMs)) may naturally inherit the same limitations originating from the traditional neuron model.

Figure 1:
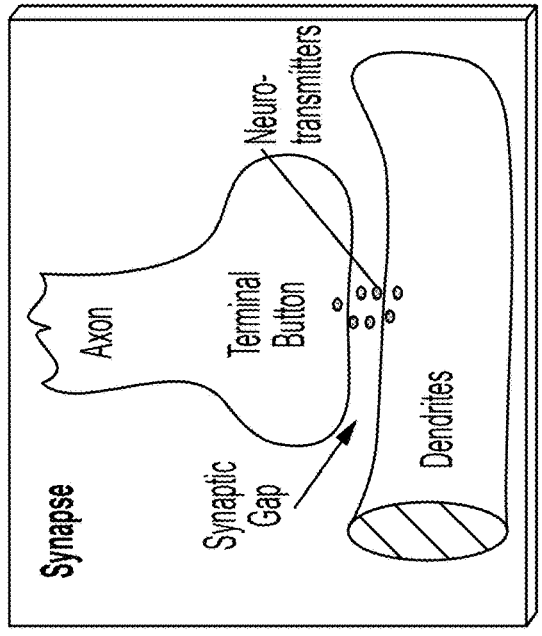
FIG. 1 illustrates a biological neuron (left) with the direction of the signal flow and a synapse (right).
Figure 1:
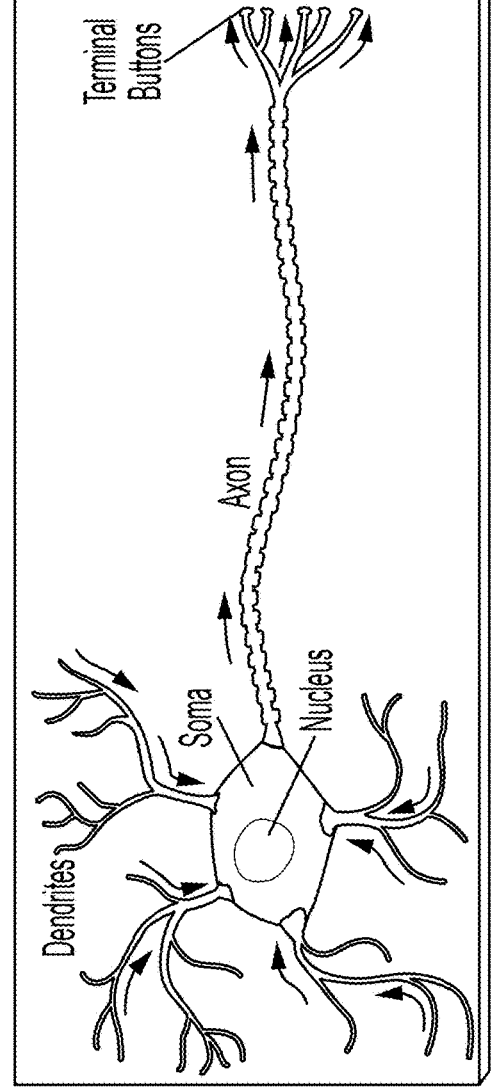

In biological learning systems, some limitations mentioned above may be addressed at the neuron cell level. For example, in the mammalian brain and nervous system, each neuron (for example, as shown in FIG. 1) may conduct electrical signals over three distinct operations: 1) synaptic connections in dendrites (an individual operation over each input signal from the synapse connection of the input neuron's axon terminals); 2) a pooling operation of the operated input signals via spatial and temporal signal integrator in the soma; and 3) an activation in the initial section of an axon or axon hillock (if the pooled potentials exceeds a certain limit, it may "activate" a series of pulses (called action potentials)). As illustrated on the right side of FIG. 1, each terminal button may be connected to other neurons across a small gap called synapse. The physical and neurochemical characteristics of each synapse may determine the signal operation, which generally may be nonlinear along with the signal strength and polarity of the new input signal. Information storage or processing may be concentrated in the cells' synaptic connections, or more precisely, through certain operations of these connections together with the connection strengths (weights). Accordingly, in neurological systems, several distinct operations with proper weights (parameters) may be created to accomplish such diversity and trained in time to perform (i.e., learn) many neural functions. Biological neural networks with higher diversity of computational operators have more computational power, and adding more neural diversity may allow the network size and total connections to be reduced.

Figure 2:
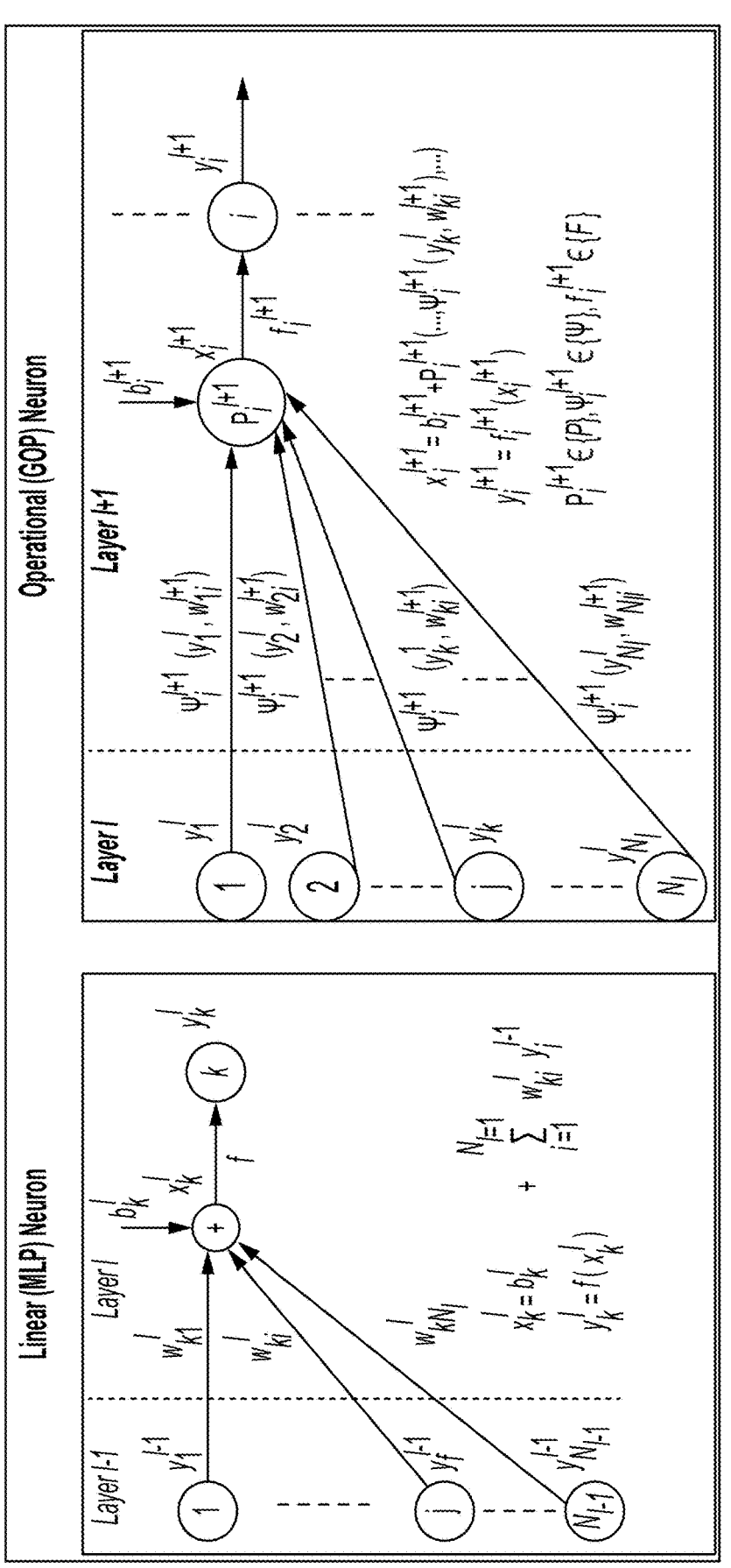
FIG. 2 illustrates a conventional multi-layer perceptron neuron vs. a generalized operational perception neuron with nodal $$\Psi_i^{l+1},$$

In light of these biological foundations, a feed-forward and fully-connected neural network model, which may be known as generalized operational perceptrons (GOPs), may accurately model the actual biological neuron and related synaptic connections. This heterogeneous configuration may provide a superior diversity appearing in biological neurons and neural networks. In particular, the diverse set of neurochemical operations in biological neurons (the non-linear synaptic connections plus the integration process occurring in the soma of a biological neuron model) may be modelled by the corresponding "nodal" (synaptic connection) and "pool" (integration in soma) operators while the "activation" operator has directly been adopted. FIG. 2 compares the traditional perceptron neuron in MLPs against the GOP neuron model. Since the actual learning occurs in the synaptic connections with non-linear operators in general, those all-time-fixed linear model of MLPs may be generalized by the GOP neurons that allow some or any non-linear transformations to be used for defining the input signal transformations at the neuron level.

MLPs, and their derivatives CNNs, both have the disadvantage of a homogenous network structure with an identical "linear" neuron model. As a result, these networks are simple models of the biological neurons or mammalian neural systems, which are heterogeneous and composed of a highly diverse neuron types with distinct biochemical and electrophysiological properties. With such crude models, conventional homogenous networks can adequately learn and solve problems with a monotonous, relatively simple and linearly separable solution space, yet fail to accomplish this whenever the solution space is highly nonlinear and complex. Despite attempting to address this disadvantage by searching for improved network architectures, following extremely laborious search strategies, using hybrid network models, and new parameter update approaches, no previous solutions have addressed the core problem of network homogeneity with only linear neurons coming from, for example, McCulloch-Pitts models.

To address this disadvantage, GOPs may include a heterogeneous and dense network model. In particular, GOPs may model biological neurons with distinct synaptic connections. GOPs may also improve diversity encountered in biological neural networks, improving performance levels where conventional MLPs fail (e.g., two-spirals or N-bit parity problems). Based upon GOPs, a heterogeneous and non-linear network model, such as ONN, may be a superset of CNNs. Similar to GOPs, ONNs may improve the diversity to learn highly complex and multi-modal functions or spaces with minimal network complexity and training data. More specifically, the diverse set of neurochemical operations in biological neurons (the non-linear synaptic connections plus the integration process occurring in the soma of a biological neuron model) may be modelled using a corresponding "Nodal" (synaptic connection) and "Pool" (integration in soma) operators, whilst the "Activation" operator has directly been adopted. A particular set of nodal, pool, and activation operators may form an "operator set" and potential operator sets are stored in an operator set library. Using the GIS method, an optimal operator set per layer may be iteratively searched during several short BP training sessions. The final ONN may then be configured by using the best operator sets found, each of which may be assigned to all neurons of the corresponding hidden layers. The results over challenging learning problems may demonstrate that 1) with the right operator set, ONNs may perform the required linear or non-linear transformation in each layer/neuron, so as to maximize the learning performance, and 2) ONNs may outperform CNNs as well as learn those problems where CNNs fail.

However, ONNs may include several disadvantages, such as limited heterogeneity due to the usage of a single operator set for all neurons in a hidden layer. This may support the sole usage of single nodal operator for all kernel connections of each neuron to the neurons in the previous layer. One limitation is that the learning performance of the ONN may depend on the operators (particularly nodal operators) in the operator set library, which may be set in advance. Thus, if the right operator set for a proper learning is missing, the learning performance may deteriorate. It may not be feasible to cover all possible nodal operators since there may be an extremely high number of nodal operators. Furthermore, many modal operators may not be formulated with standard non-linear functions, yet may be approximated. Finally, the GIS may be a computationally demanding local search process which may need to use many BP runs. The best operator sets found may not be optimal, and especially for deep networks that are trained over large-scale datasets, GIS may result in a real bottleneck computational complexity.

Certain example embodiments described herein may have various benefits and/or advantages to overcome the disadvantages described above. For example, since GOP neurons naturally became a superset of linear perceptrons (i.e., MLP neurons), GOPs may provide an opportunity to better encode input signals using linear and non-linear fusion schemes and, thus, may lead to more compact neural network architectures achieving highly superior performance levels. For example, certain studies have shown that GOPs may achieve elegant performance levels on many challenging problems where MLPs entirely fail to learn such as "Two-Spirals", "N-bit Parity" for N>10, "white Noise Regression," etc. As a superset, a GOP network may fall back to a conventional MLP when the learning process defining the neurons' operators indicates that the native MLP operators may be used for the learning problem in hand.

Furthermore, certain embodiments may provide a machine learning paradigm, and may be used in any deep learning or machine learning application. Specifically, certain embodiments may be used in any application where CNNs may be used. Self-ONNs may be a superset of CNNs, and may have a superior learning ability. As a new generation, non-linear and heterogeneous network, certain embodiments may have potential to replace traditional CNN applications and methods in various domains such as healthcare, smart devices, personal assistants, media annotations and tagging, computer vision, etc. Thus, certain example embodiments discussed below are directed to improvements in computer-related technology.

In order to provide a heterogeneity level that may boost network diversity along with computational efficiency, certain embodiments may provide self-organized ONNs (Self-ONNs) with generative neurons that may have the ability to adapt (i.e., optimize) the nodal operator of each connection during the training process. Therefore, Self-ONNs may have a heterogeneity level needed by the learning problem at hand. Moreover, this ability may reduce or eliminate the need of having a fixed operator set library, and the prior operator search within the library in order to find the best, or a sufficient, possible set of operators. Furthermore, certain embodiments may provide a training method to back propagate the error through the operational layers of Self-ONNs. Certain embodiments may also provide an artificial neuron model that significantly improves performance over other artificial neurons. Therefore, certain embodiments may be useful to high-tech companies in IT, internet of things (IoT), and AI domains.

Certain embodiments may provide for self-organized operational neural networks (Self-ONNs) to self-organize the network operators during training. Thus, Self-ONNs may not need any operator set library in advance, and may not need to have any prior search process to find the optimal nodal operator. The limitation of the usage of a single nodal operator for kernel connections of each neuron may be addressed by the "generative neurons," where each neuron may create any combination of nodal operators, which may not be a well-defined function such as linear, sinusoids, hyperbolic, exponential or some other standard functions. Although the weights or parameters of the kernel may change the nodal operator output, e.g., for a "Sinusoid" nodal operator of a particular neuron, kernel parameters may be distinct frequencies. This may facilitate the creation of "any" harmonic function; however, the final nodal operator function after training may not have a pattern or form other than a sine wave even though a "composite operator" (e.g., the linear combination of harmonics, hyperbolic and polynomial, or an arbitrary nodal operator function) may be a better choice for the neuron than sinusoids. This may be the case for biological neurons where the synaptic connections can exhibit any arbitrary form or pattern. In brief, a generative-neuron may be a neuron with a composite nodal-operator that can be generated during training without any restrictions. As a result, with such generative neurons, a self-ONN can self-organize its nodal operators during training and thus, it may have the nodal operator functions "optimized" by the training process to maximize, or improve, the learning performance. For instance, as illustrated in FIG. 3, CNN and ONN neurons may have static nodal operators (linear and harmonic, respectively) for their 3×3 kernels, while the generative-neuron may have any arbitrary nodal function, $\psi$, (including possibly ordinary types such as linear and harmonic functions) for each kernel element of each connection. This may enhance flexibility that permits the formation of any nodal operator function. Furthermore, the training method that back-propagates the error through the operational layers of Self-ONNs may be formulated in order to generate the right nodal functions of its neurons. Certain embodiments may show that Self-ONNs may achieve similar or better performance levels than the parameter-equivalent ONNs with an improved computational efficiency. The performance gap compared against the equivalent CNNs may further widen even for Self-ONNs with significantly fewer neurons and with a shorter training.

FIG. 3 illustrates a neuron model, such as a "generative-neuron," which may be an artificial neuron with a composite nodal-operator that can be generated during training without any restrictions. As a result, with such generative neurons, a self-ONN may self-organize its nodal operators during training and thus, may have the nodal operator functions "optimized" by the training process to maximize the learning performance. Furthermore, certain embodiments may include Self-ONNs, wherein a heterogeneous network model based on the neuron model may be included, which may have an improved diversity and learning capability compared to a homogenous (linear) network model of CNNs and conventional ONNs. A stochastic gradient-descent (BP) training method may be included in certain embodiments with certain implementation features. The results over various challenging problems may demonstrate that Self-ONNs may not only outperform CNNs and ONNs, they may be able to learn those problems where the CNNs fail.

In various example embodiments, ONNs may include: 1) bio-neurological systems including the mammalian visual system that may be based on heterogeneous, non-linear neurons with varying synaptic connections, and 2) the corresponding heterogeneous artificial neural network (ANN) models encapsulating non-linear neurons (i.e., GOPs) may demonstrate such a superior learning performance that may not be achieved by their conventional linear counterparts (e.g., MLPs) unless significantly deeper and more complex configurations are used. As a result, heterogeneous networks with the right operator set and a proper training may provide the kernel transformation to discriminate separate classes, or to approximate the underlying complex function. In neuro-biology, these points may include the "neuro-diversity" or more precisely, "the biochemical diversity of the synaptic connections." Thus, similar to MLPs, ONNs may be extended to realize conventional CNNs. Having the same two restrictions (i.e., "limited connections" and "weight sharing"), heterogeneous ONNs may perform linear and/or non-linear operations.

Feed-forward, fully-connected ANNs and/or MLPs may be universal approximators. However, their learning performance may vary significantly depending on the function or the solution space that they attempt to approximate, for example, because of their "homogenous" configuration based solely on the linear neuron model. Therefore, while they may quickly adapt to problems with a monotonous, relatively simple, and linearly separable solution space, they may entirely fail to do so when the solution space is highly nonlinear and complex. Sharing the same fixed "linear" neuron model with two additional constraints (local connections and weight sharing), this may also be the case for the conventional CNNs and, it may, therefore, not be surprising that in many challenging problems the "deep" CNNs with a massive complexity and depth can achieve the diversity and the learning performance. In order to address this drawback and also to accomplish a more generalized model over the convolutional neurons, some embodiments may include a network model, such as an ONN, which can be heterogeneous and encapsulate neurons with any set of operators to boost diversity and to learn highly complex and multi-modal functions or spaces with minimal network complexity and training data. A training method may be formulated as a primary technique to back-propagate the error through the operational layers of ONNs, which may yield superior learning capabilities of ONNs even with few neurons and hidden layers.

Some example embodiments may include a novel neuron model configured to generalize the linear neuron model of conventional CNNs with any non-linear operator. A novel heterogeneous network model based on this new neuron model may have a superior diversity and learning capability compared to homogenous (i.e., linear) network for model of CNNs. Coupled with various operator sets, network model ONNs may perform the linear/non-linear transformation in each layer/neuron, thereby maximizing the learning performance. Furthermore, a novel stochastic gradient-descent (e.g., BP) training method may be formulated with the implementation features. ONNs may significantly outperform CNNs, as well as learn those problems where the CNNs entirely fail.

In various example embodiments, ONNs may be used in applications where CNNs are used. ONNs may include a superset of CNNs, and may have a superior learning ability. As a new generation, non-linear and heterogeneous network, ONNs may replace traditional CNN applications and methods in various domains such as healthcare, smart devices, personal assistants, media annotations and tagging, computer vision, etc.

FIG. 4 illustrates an example of a system according to certain example embodiments. In one example embodiment, a system may include, for example, computing device 410.

Computing device 410 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Computing device 410 may include at least one processor, indicated as 411. Processors 411 may be embodied by any computational or data processing device, such as a central processing unit (CPU), application specific integrated circuit (ASIC), or comparable device. The processors may be implemented as a single controller, or a plurality of controllers or processors.

At least one memory may be provided in computing device 410, as indicated at 412. The memory may be fixed or removable. The memory may include computer program instructions or computer code contained therein. Memory 412 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processor 411, memory 412, and any subset thereof, may be configured to provide means corresponding to the various techniques discussed above and illustrated in FIGS. 1-3. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 4, transceiver 413 may be provided, and one or more devices may also include at least one antenna, respectively illustrated as 414. The device may have many antennas, such as an array of antennas configured for multiple input multiple output (MIMO) communications, or multiple antennas for multiple RATs. Other configurations of these devices, for example, may be provided. Transceiver 413 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the techniques described above (i.e., FIGS. 1-3). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the techniques discussed above and illustrated in FIGS. 1-3. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

According to certain example embodiments, processor 411 and memory 412 may be included in or may form a part of processing circuitry or control circuitry. In addition, in some example embodiments, transceiver 413 may be included in or may form a part of transceiving circuitry.

In some example embodiments, an apparatus (e.g., computing device 410) may include means for performing a method, a process, or any of the variants discussed herein. Examples of the means may include one or more processors, memory, controllers, transmitters, receivers, and/or computer program code for causing the performance of the operations.

In various example embodiments, computing device 410 may be controlled by processor 411 and memory 412 to perform various techniques discussed above and illustrated in FIGS. 1-3.

Certain example embodiments may be directed to an apparatus that includes means for performing any of the methods described herein including, for example, means for performing various techniques discussed above and illustrated in FIGS. 1-3.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

AI Artificial Intelligence
ANN Artificial Neural Network
ASIC Application Specific Integrated Circuit
BP Back Propagation
CNN Convolutional Neural Network
CPU Central Processing Unit
GIS Greedy Iterative Search
GOP Generalized Operational Perceptron
GPS Global Positioning System
HDD Hard Disk Drive
IoT Internet of Things
LSTM Long Short-Term Memory
MLP Multi-Layer Perceptron
ONN Operational Neural Network
PDA Personal Digital Assistance
RAM Random Access Memory
RBF Radial Basis Function
RNN Recurrent Neural Network

We claim:

1. An apparatus comprising:
at least one processor;
at least one memory; and
an operational neuron model configured to perform operations using the at least one processor and at least one memory, comprising:
an artificial neuron comprising a composite nodal operator;
a pool-operator; and
an activation function operator, wherein the composite nodal operator comprises a linear function or non-linear function, wherein the operational neuron model is configured to perform a stochastic gradient-descent training method comprising back propagation, and the composite nodal operator comprises at least one kernel parameter of a distinct frequency.

2. The operational neuron model of claim 1, wherein the composite nodal operator comprises at least one of a sinusoid, exponential, Gaussian, and Laplacian function or any other nonlinear function.

3. The operational neuron model of claim 2, wherein the operational neuron model reduces to a convolutional neuron model based upon the composite nodal operator comprising the linear function.

4. An apparatus comprising:
at least one processor;
at least one memory; and
a generative neuron model configured to perform operations using the at least one processor and at least one memory, comprising:
a composite nodal operator generated during training using Taylor polynomial approximation without restrictions, wherein the generative neuron model is configured to perform a stochastic gradient-descent training method comprising back propagation, and the composite nodal operator comprises at least one kernel parameter of a distinct frequency.

5. The generative neuron model of claim 4, wherein an order of the polynomial of the Taylor polynomial approximation comprises a network parameter.

6. The generative neuron model of claim 5, wherein the generative neuron model reduces to a convolutional neuron of a CNN when the order of the polynomial of the Taylor polynomial equals to 1.

7. The generative neuron model of claim 4, wherein the generative neuron model is configured to self-organize the composite nodal operator during training.

8. An apparatus comprising:
at least one processor;
at least one memory; and an operational neural network (ONN) configured to perform operations using the at least one processor and at least one memory, comprising:

a neuron model configured to perform at least one linear or non-linear transformation in each of a plurality of neuron layers, wherein the operational neuron model is configured to perform a stochastic gradient-descent training method comprising back propagation, and the neuron model comprises at least one kernel parameter of a distinct frequency.

9. An apparatus comprising:

at least one processor;

at least one memory; and an operational neural network configured to perform operations using the at least one processor and at least one memory, comprising one or more layers of operational neurons, wherein the operational neuron model is configured to perform a stochastic gradient-descent training method comprising back propagation, and the operational neuron model comprises at least one kernel parameter of a distinct frequency.

10. An apparatus comprising:

at least one processor;

at least one memory; and a self-organized operational neural network (Self-ONN) configured to perform operations using the at least one processor and at least one memory, comprising one or more layers of generative neurons, wherein the Self-ONN is configured to perform a stochastic gradient-descent training method comprising back propagation, and the operational neuron model comprises at least one kernel parameter of a distinct frequency.

* * * * *